Aug. 28, 1934.  F. SCHAFER  1,971,992
MACHINE FOR MAKING PAPER OR CARD MATCHES
Filed Sept. 14, 1931  9 Sheets-Sheet 1

INVENTOR.
Frank Schafer.

Aug. 28, 1934.   F. SCHAFER   1,971,992
MACHINE FOR MAKING PAPER OR CARD MATCHES
Filed Sept. 14, 1931   9 Sheets-Sheet 3

INVENTOR.
Frank Schafer

Aug. 28, 1934.  F. SCHAFER  1,971,992
MACHINE FOR MAKING PAPER OR CARD MATCHES
Filed Sept. 14, 1931  9 Sheets-Sheet 4
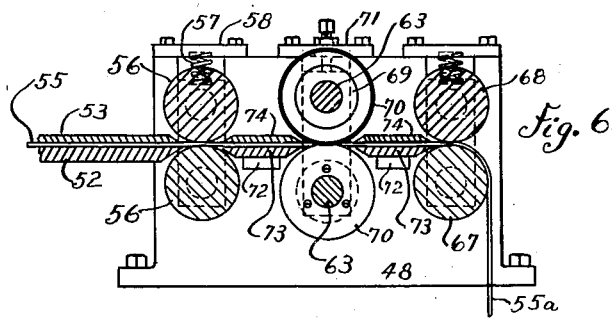
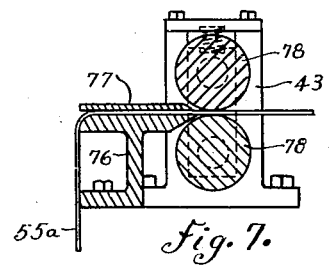
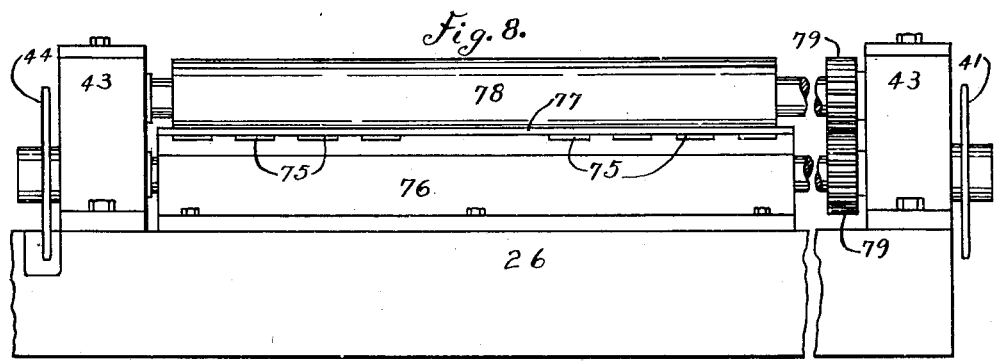
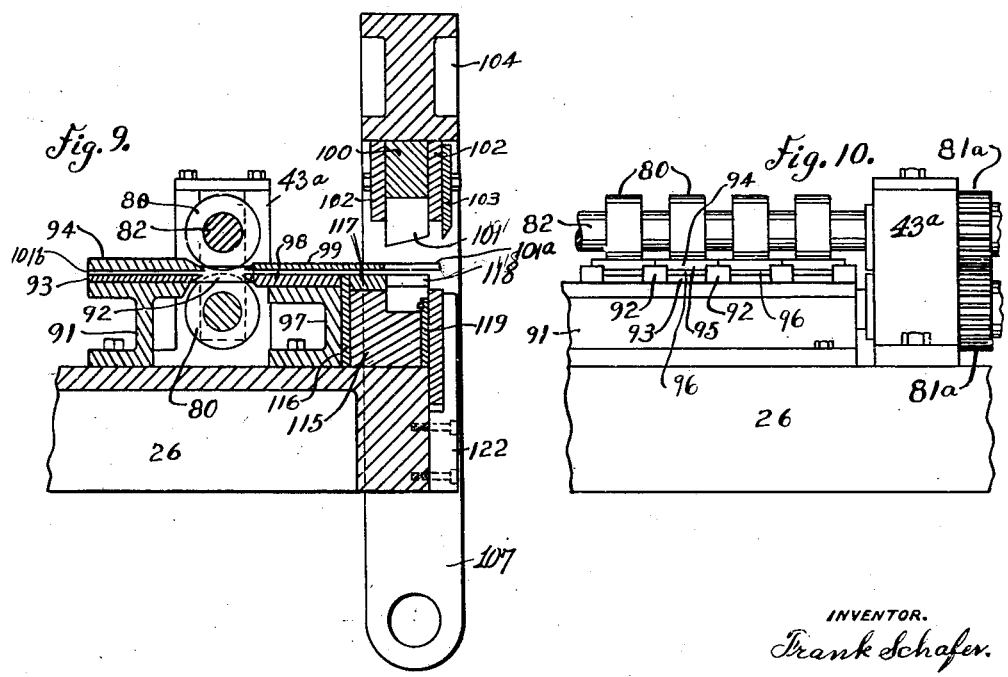
INVENTOR.
Frank Schafer.

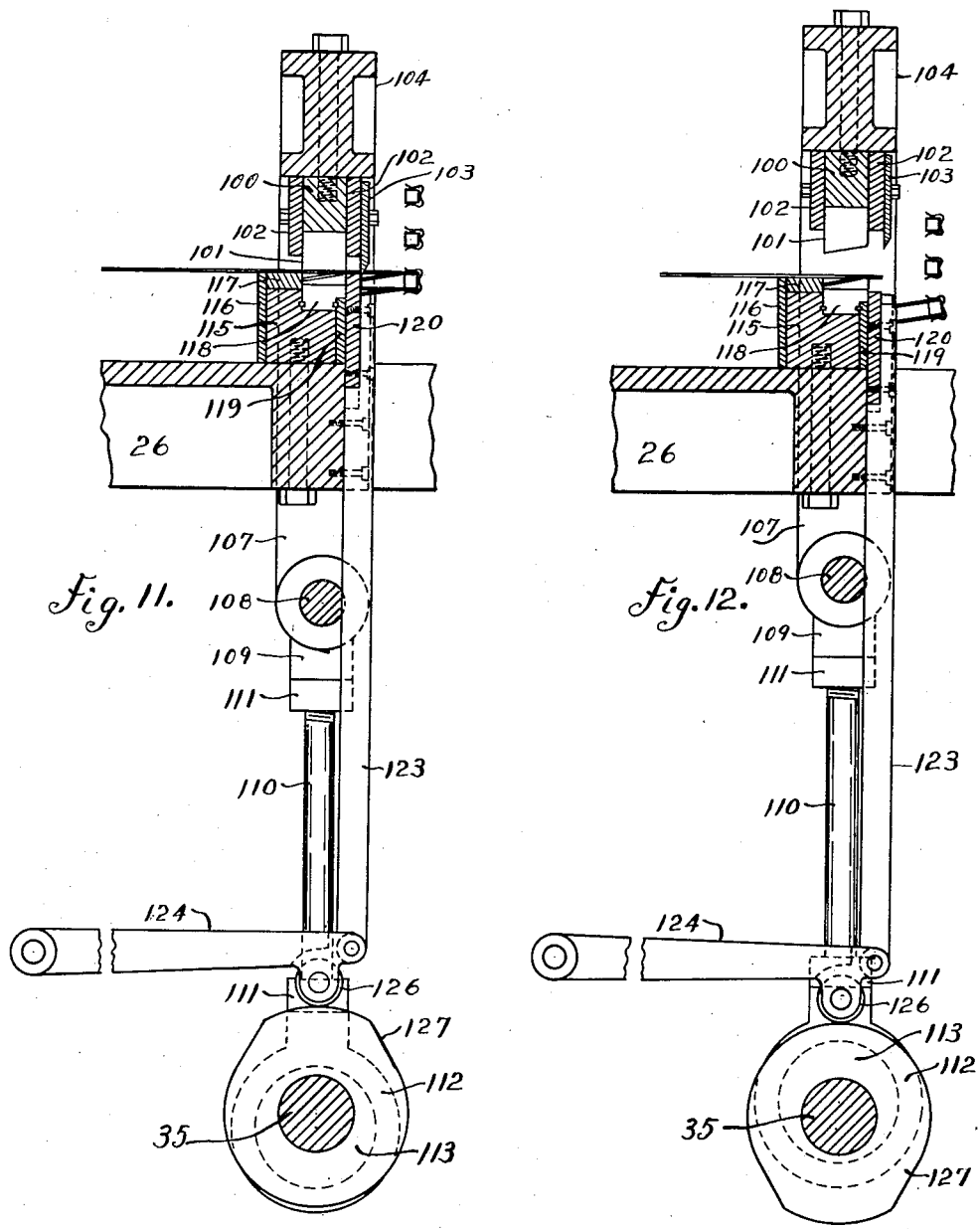

Aug. 28, 1934. F. SCHAFER 1,971,992
MACHINE FOR MAKING PAPER OR CARD MATCHES
Filed Sept. 14, 1931 9 Sheets-Sheet 6

INVENTOR
Frank Schafer.

Aug. 28, 1934.  F. SCHAFER  1,971,992
MACHINE FOR MAKING PAPER OR CARD MATCHES
Filed Sept. 14, 1931  9 Sheets-Sheet 7
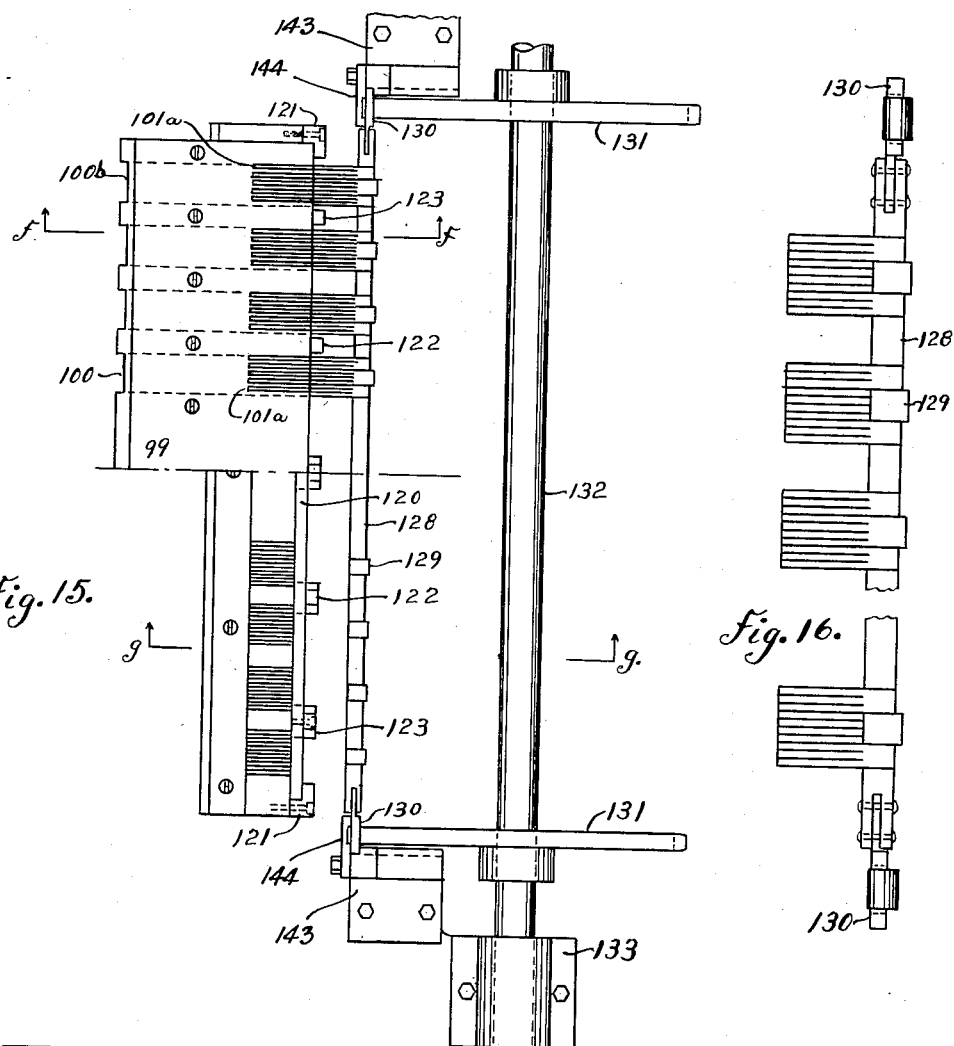
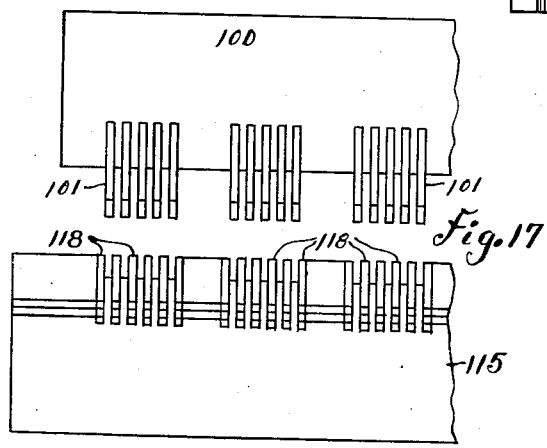
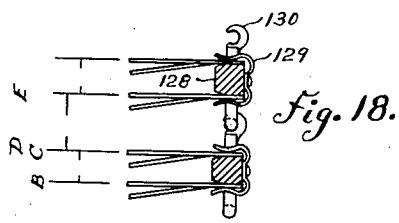
INVENTOR
Frank Schafer.

Aug. 28, 1934.   F. SCHAFER   1,971,992
MACHINE FOR MAKING PAPER OR CARD MATCHES
Filed Sept. 14, 1931    9 Sheets-Sheet 8

INVENTOR
Frank Schafer.

Aug. 28, 1934.  F. SCHAFER  1,971,992
MACHINE FOR MAKING PAPER OR CARD MATCHES
Filed Sept. 14, 1931  9 Sheets-Sheet 9
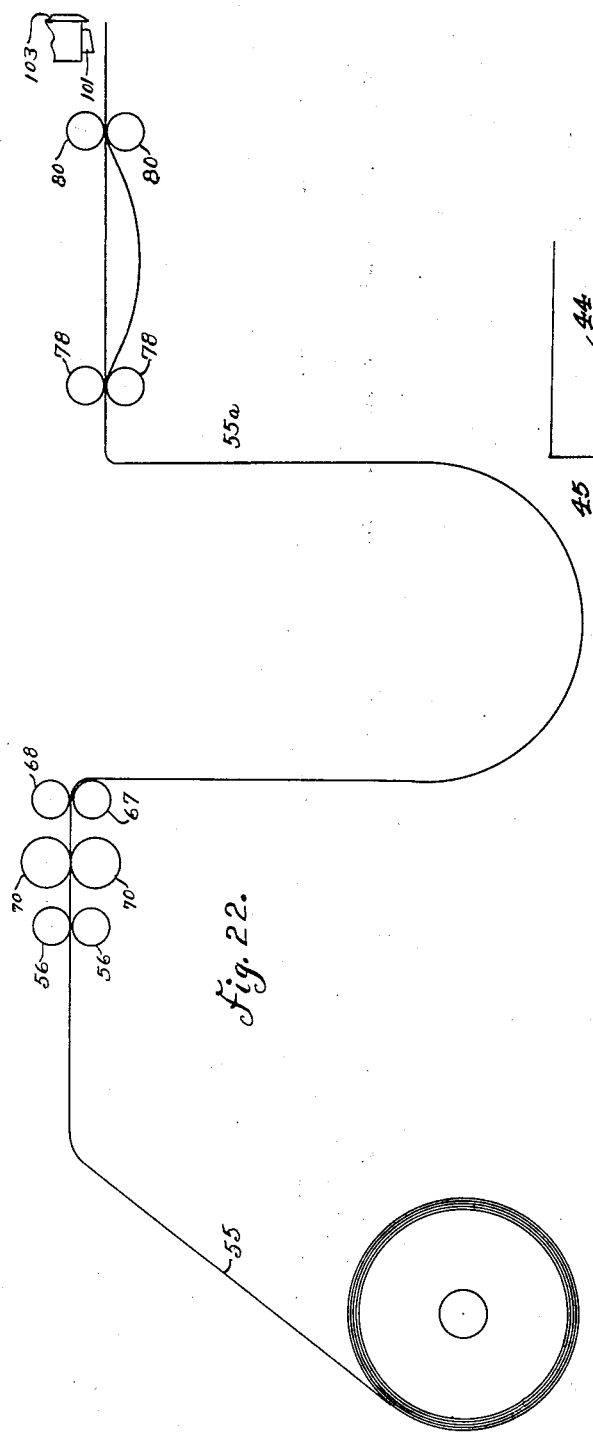
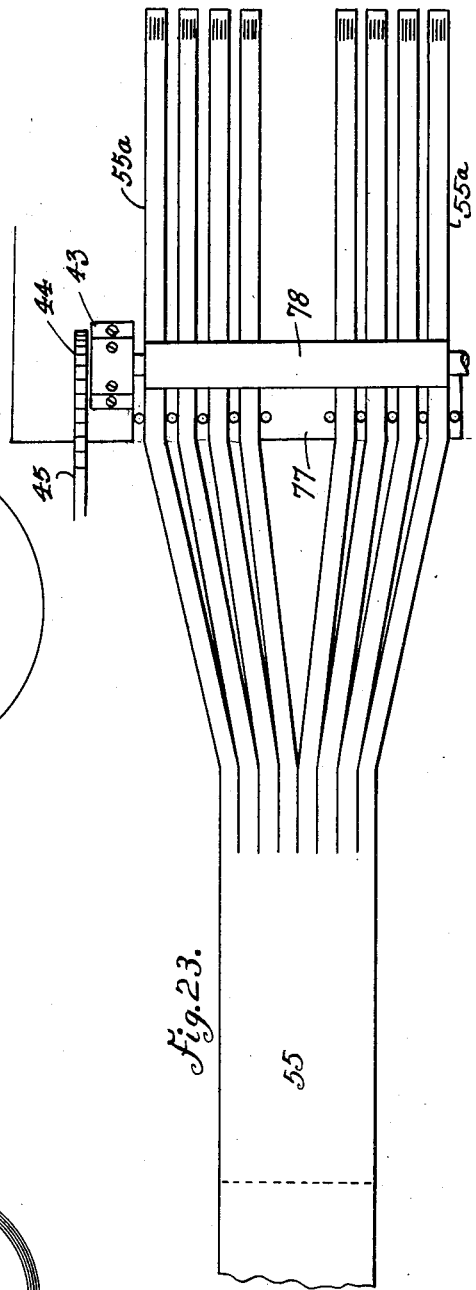
INVENTOR
Frank Schafer.

Patented Aug. 28, 1934

1,971,992

UNITED STATES PATENT OFFICE 1,971,992

MACHINE FOR MAKING PAPER OR CARD MATCHES

Frank Schafer, Duluth, Minn.

Application September 14, 1931, Serial No. 562,638

11 Claims. (Cl. 144—51)

This invention relates to a machine for making card matches, more specially those that are adapted to be secured within a book-like cover; my object being to provide a machine whereby such matches can be rapidly and efficiently produced.

In the embodiment of the invention herein illustrated, match stock, such as paper or straw board, is drawn from a suitable roll, is cut or slitted into bands of such width as are usually produced to make a match book, each separate band is fed to a punch and die where the splints are cut and every alternate splint depressed or bent out of line but having a marginal part which is advanced to and placed in an endless carrier and the attached splints are then separated from the stock during the splint forming operation on a succeeding card portion of the stock, and so on. The carrier, with the match cards thus inserted therein, in spaced relation to each other, transports the cards through the usual match making path, including paraffine and means for applying composition to the free ends of the splints, and thence to a discharge station, which will be the subject matter of a following application.

In this invention the paper stock is unrolled and fed through continuously rotating feed rollers, between two pairs of which a set of rotating slitting knives sever the stock into several bands of the desired width, then fed through another pair of continuously rotating feed rollers, then through suitable guiding slots into a pair of intermittently rotating feed rollers, which feed the bands into a punch and die whereby the splints are cut and every other alternate one depressed, of a cut-off plate which moves upwards to meet a cut-off knife and then moves downwards out of the way for the forward movement of the cards into the carrier, in which each card is held or clamped by a separate spring or clip, and between each row of cards there is a narrow and a wide space, the wide space being at the joint of the link, which permits of a much more compact drying arrangement, occupying a smaller space.

In the drawings:

Fig. 6 is an enlarged sectional view, as on lines c—c of Fig. 1, showing guideways for cardboard, feed rollers and rotating knives.

Fig. 7 is an enlarged sectional view, as on lines d—d of Fig. 1, showing the guideway for the cardboard bands and continuously rotating feed rollers.

Fig. 8 is an end view of Fig. 7.

Fig. 9 is an enlarged sectional view as on lines e—e of Fig. 1, showing guideways, intermittent feed rollers, punch and die and movable knife plate.

Fig. 10 is a view of Fig. 9 looking towards the feed rollers.

Fig. 11 is an enlarged sectional view as on lines f—f of Fig. 15, showing the movable knife plate in its upper position and the mechanism operating same.

Fig. 12 is a view similar to Fig. 11 showing the movable knife plate in its lower position.

Fig. 15 is a plan view, on a smaller scale, of Fig. 14 with the punch removed and half of die shown without stripper guide plate.

Fig. 16 is an enlarged view of the match card carrier, showing the match cards clamped to the bar by the spring clips.

Fig. 17 is an enlarged view of the punch and die as shown on the left hand side of Fig. 13 with the knife, clamping plates and movable knife plate removed.

Fig. 18 is a sectional end elevation of the carrier shown in Fig. 16 showing the spring clips holding the match cards and also indicating the difference in the space between the match cards.

Fig. 22 is a side elevation showing the path of the cardboard through the machine.

Fig. 23 is a plan view thereof, showing the cardboard cut or slitted into bands of the desired width.

Figure 1:
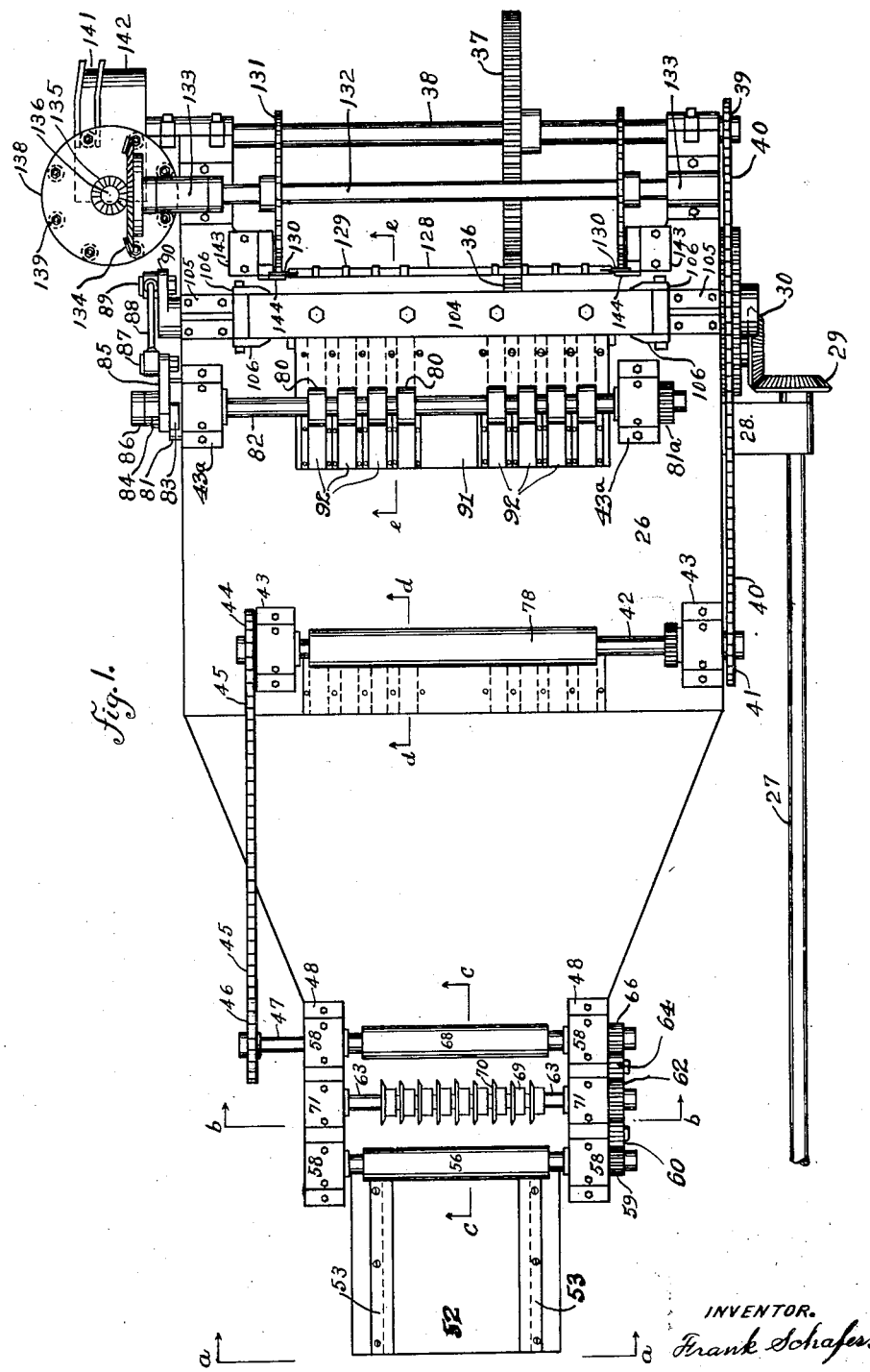
Fig. 1 is a plan view of the machine.

Referring to the drawings, 24 designates a base on which is secured standards 25 supporting a table 26.

27 designates a shaft rotating in a bearing 28 secured to the side of standard 25. Also secured to shaft 27 is a miter gear 29 meshing with a similar gear 30 on shaft 31, rotating in bearings 32, secured to base 24. The shaft 27 is driven by a motor through suitable gearing and extends alongside of the machine.

33 designates a gear also secured to shaft 31 and which meshes with gear 34 secured to shaft 35 rotating in bearings on standards 25; also secured to shaft 35 is a gear 36 meshing with gear 37 secured to shaft 38, which also rotates in bearings on standards 25. (See Figs. 1—2—3.)

39 designates a sprocket secured to shaft 38 and around which passes a chain 40, which also passes around sprocket 41 secured to shaft 42 rotating in bearings in bracket 43 secured to table 26. (See Figs. 1—2.)

To the other end of shaft 42 is secured sprocket 44 around which passes chain 45 which also passes around a similar sprocket 46 secured to shaft 47 rotating in bearings in bracket frame 48 secured to table 49, which is supported by standards 50 secured to base 24. The use of the aforesaid sprockets and chains will presently be explained. (See Figs. 1—2.)

51 designates a bracket secured to table 49 which supports a plate 52 to the top of which is secured two guide bars 53 having the recesses 54 on the inner side thereof and through which is fed the cardboard 55, which is unwound from a roll of this material. The roll of cardboard is placed in suitable stands (not shown) so as to be free to unwind. (See Figs. 1—2—4—22.)

When the cardboard 55 is fed through the guides 53, it is gripped by the feed rollers 56 which rotate in bearings located in suitable slots in the bracket 48. The upper roller is free to move up and down and is held in contact with the cardboard by springs 57 set in a counterbore in cap 58 and the upper bearing. The feed rollers 56 are rotated in unison by gears 59, the lower one of which meshes with an idler gear 60 on stud 61. The latter gear meshes with a gear 62 secured to shaft 63 rotating in bearings in bracket 48. The gear 62 meshes with idler gear 64 rotating on stud 65, idler gear 64 meshes with gear 66 secured to the end of shaft 47, to which is secured sprocket 46, which is rotated by the sprocket chain and gears heretofore mentioned. The shaft 47 carries a roller 67 having its upper complementary roller 68 rotating in bearings similar to the upper roller 56. These two rollers rotate in unison by means of gears 66. (See Figs. 1—2.)

Secured to shafts 63 are collars 69 to which are screwed the circular slitting knives 70, which slit the cardboard into the desired widths. The shafts 63 rotate in bearings in slots in bracket 48, and have a suitable distance piece between them so that the cutting edges of the knives 70 shall pass one another and are locked in place by set screw and lock nut in cap 71. (See Figs. 1—5—6.) The cardboard bands 55a are allowed to drop down, forming a loop, and then brought upwards, and pass through the openings 75 in bracket 76. (See Figs. 2—7—8.)

On the inside of the brackets 48 are cast shelves 72 on which are secured plates 73 which support and guide the cardboard from one feed roller to the other and while it is being slitted into bands, a similar plate 74 with a suitable distance piece between them forms the upper guide. In Fig. 23 is shown the cardboard 55 slitted into bands, which can be fed directly into another pair of feed rollers or, as shown, allowed to drop into a loop and each band 55a is then fed through a recess 75 in a bracket 76 secured to the table 26. The bands 55a are deflected or separated by being fed through the recesses 75 which are spaced the desired distance apart. (See Fig. 8.) A guide plate 77 is also secured to the top of bracket 76. The feed rolls 78 are similar to feed rolls 56, 67 and 68, except that they are wider and are caused to rotate in unison by gears 79 secured to shaft 42 and to the upper feed roll, both of which rotate in suitable bearings in bracket 43 secured to the table 26 see Figs. 7—8.

The cardboard bands 55a are now fed to a pair of intermittently rotating rollers 80, rotating in suitable bearings in bracket 43a. These rollers are rotated in unison by gears 81a. 81 designates a four tooth ratchet secured to shaft 82 of rollers 80 and against which impinges the ratchet dog 83 pivoted on a stud 84 on bell-crank lever 85 which is loosely mounted on shaft 82 and is held in place by collar 86. The other end of the bell-crank lever 85 carries the stud 87 to which is pivoted the connecting rod 88 which is also pivoted to stud 89 in crank 90 secured to shaft 35. (See Figs. 1—2.)

91 designates a bracket secured to the top of table 26 on which are screwed bars 92 which pass between the feed rollers 80. In the space between the bars 92 are placed bars 93 and on top of bars 92 are placed bars 94 having an extending portion 95 which leaves a space 96 between the bars 93 and 94 through which the bands 55a are fed. (See Figs. 9—10.)

97 designates a bracket secured to table 26 and on which is a plate 98 to which is screwed a stripper plate 99 having recesses 100b therein for the passage of the bands 55a to the punch and die. The stripper plate also has recesses 101a therein for the passage of the punches 101. See Figs. 9—19—14 and right hand side of Figs. 13 and 15.

The punch consists of a body 100 in suitable slots of which is held the steel punches 101 clamped by plates 102, to the outer one of which is clamped the cutoff knife 103. The punch body 100 is secured to the cross-head 104 reciprocating in ways formed by the bracket 105 and gibs 106, the bracket 105 being secured to the table 26. (See Figs. 1—2—3—9—11—12—13—17.)

The cross-head 104 has depending portions 107 in which is secured a shaft 108 on which are pivoted the connecting rods consisting of bearing ends 109 into which are screwed the rods 110 with right and left hand threads and locking nuts 111 said rods being also screwed into eccentric straps 112 mounted upon eccentrics 113 which are secured to shaft 35 which reciprocates the cross-head. A collar 114 is secured to shaft 108 to keep bearing end 109 in place. The die consists of a body 115, backing plate 116, cutting plate 117, steel blades 118 which are complementary to punches 101 and a locking plate 119. The die body 115 is secured to table 26. (See Figs. 9—11—12—14—17.)

120 designates a cutoff plate which moves vertically in front of the die and is guided at the ends by the caps 121 which are screwed to the front face of the die and also the finished face of table 26. (See Figs. 3—13—15.) The plate 120 is also guided by bars 122 secured to the front face of table 26 and having a recess therein for the movement of this plate. It will also be noted that the upper end of bars 122 are made narrow so that the splints will clear them in their downward motion in the match carrier. (See Figs. 3—9—13—14—15.)

The plate 120 is secured to bars 123 pivoted on arms 124 which are pivoted on a shaft 125 in standards 25. Also pivoted in arms 124 are rollers 126 which ride on the periphery of cams 127 secured to shaft 35, the contour of the cams 127 being such that it effects the timely reciprocation of the plate 120. (See Figs. 2—3—11—12—13.)

128 designates a bar of the carrier having the spring clips 129 thereon, each of which clasps the match card to the outside of the bar. At each end of the bar is riveted a malleable iron link 130 to form an endless chain, the link 130 meshing with a sprocket 131 secured to shaft 132, intermittently rotating in bearings 133 secured to the top of table 26. To one end of shaft 132 is secured the bevel gear 134 meshing with bevel pinion 135 secured to shaft 136, intermittently rotating in bearings 137, secured to the side of standard 25. At the lower end of shaft 136 is secured a disk 138 having studs 139 equally spaced therein and on which are the rollers 140 moving in the groove 141 of cam 142 secured to shaft 38. (See Figs. 14—15—16—18—19.)

143 designates a bracket secured to the top of table 26 and to which is fastened a cap 144 between which is formed a passageway for the guiding of link 130 and consequently the bar 128 in its movement by the sprockets 131. (Figs. 1—14—15.)

Figure 19:
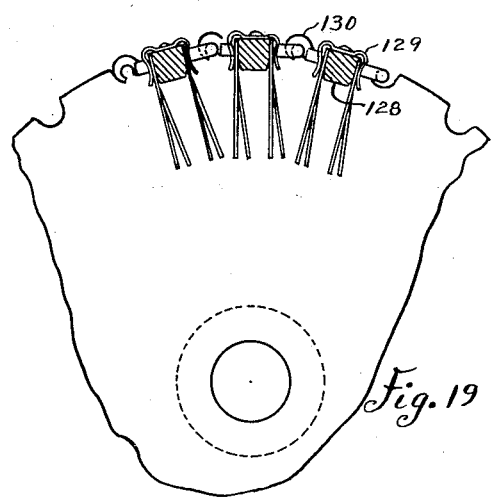
Fig. 19 is a sectional view of the carrier and sprocket, showing one of the reasons for the variation in the space between adjacent rows of card matches.
Figure 20:
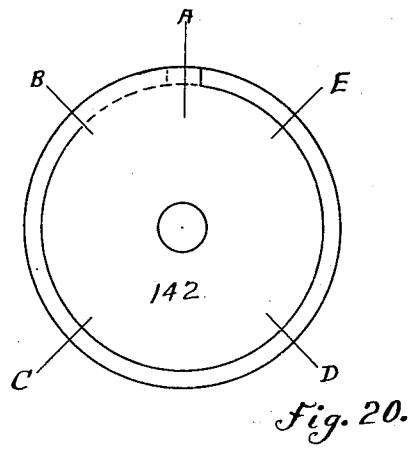
Fig. 20 is a view of the cam indicating the spacing of the contour of the grooves which causes the variation in the spacing of the match cards.
Figure 21:
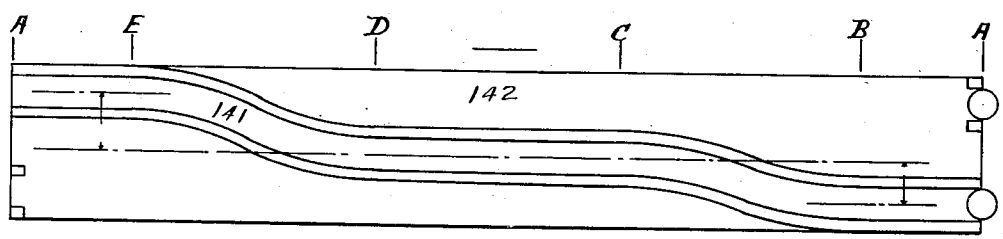
Fig. 21 is a development of the groove of this cam.

Referring to Figs. 20 and 21, is shown the cam 142 and cam groove 141 in which is indicated the means whereby the varying movements of the carrier is accomplished. From A to B is a portion in which the groove 141 is straight, no movement of the carrier resulting from the movement of cam; from B to C is the short movement; from C to D, the carrier is stationary; from D to E is the long movement; E to A no movement. The movement from E to B is where one end of groove 141 begins and ends, the groove continuing a slight distance either side of the center line, the cam locking the disk 138 in this position with two of the rollers 140, as it also locks it from C to D where only one roller 140 is in the cam groove. (See Figs. 18—20—21.)

Figure 14:
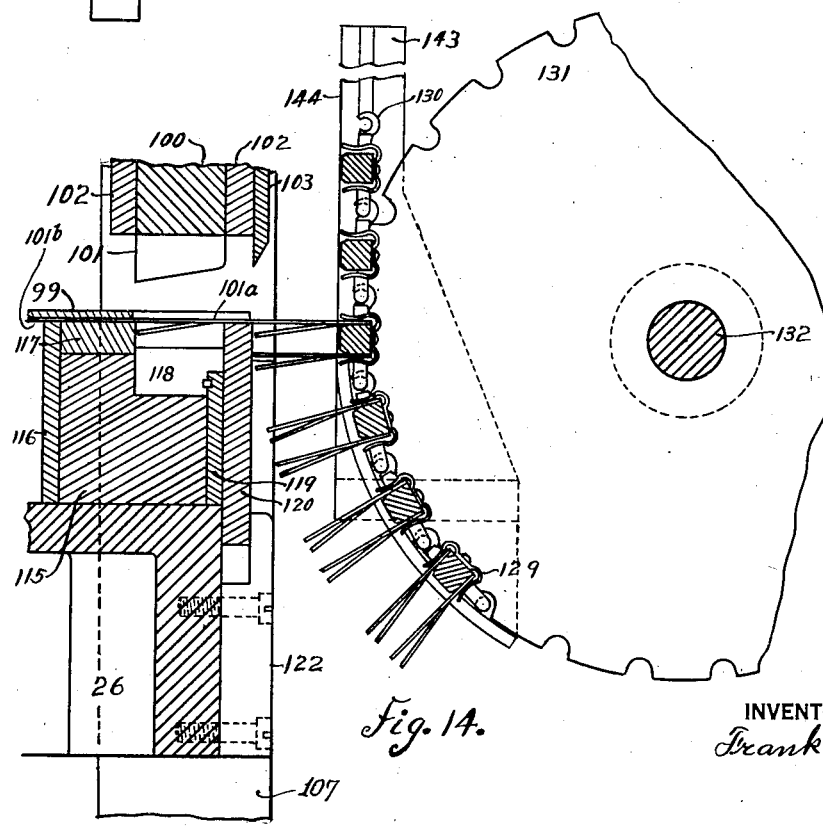
Fig. 14 is an enlarged view, as on lines g—g of Fig. 15, showing the match card inserted in the carrier and the movable knife plate in position for knives to sever splints from cardboard.

One of the reasons for the wide and narrow spacing of the match cards as indicated in Fig. 18 is shown in Fig. 19, wherein it is seen that when the match carrier passes around a sprocket with the matches pointing to the center of the sprocket, the space between the heads of the matches in the joints of the link come much closer together than in the case when the matches point outwardly as in Fig. 14 as it is essential that the heads do not touch. This construction permits the use of smaller sprockets, which would not be possible if the cards were equally spaced. Hence this construction conserves space. The usual practice is to allow a certain length of time for the match heads to dry, which necessitates a chain several hundred feet long before discharging the matches.

The operation is as follows:

A roll of cardboard is placed on a stand, the end pushed through the guides 53 into the feed rolls 56 which on being rotated by gears 59, gears 60, 62, 64 and 66, shaft 47, sprocket 46, chain 45, sprocket 44, shaft 42, sprocket 41, chain 40, sprocket 39, shaft 38, gears 37 and 36, shaft 35, gears 34 and 33, shaft 31, bevel gears 30 and 29 and shaft 27, to which motion is imparted by a suitable motor, is caused to feed the cardboard through guides 73 and 74 to the circular knives which slit the cardboard into suitable bands, which are then fed through guides 73 and 74 into feed rollers 67 and 68. (Figs. 6—22.) The bands are allowed to form a loop and then fed through guides 76 and 77 into feed rollers 78 (Figs. 7—8), then fed through guides 93 and 94 into feed rollers 80 which are the same width as or a trifle narrower than the bands. The feed rollers 80 are rotated intermittently by ratchet 81, dog 82, bell-crank 85, connecting rod 88 and crank 90 on shaft 35. (Figs. 1—2—9—10.)

Figure 2:
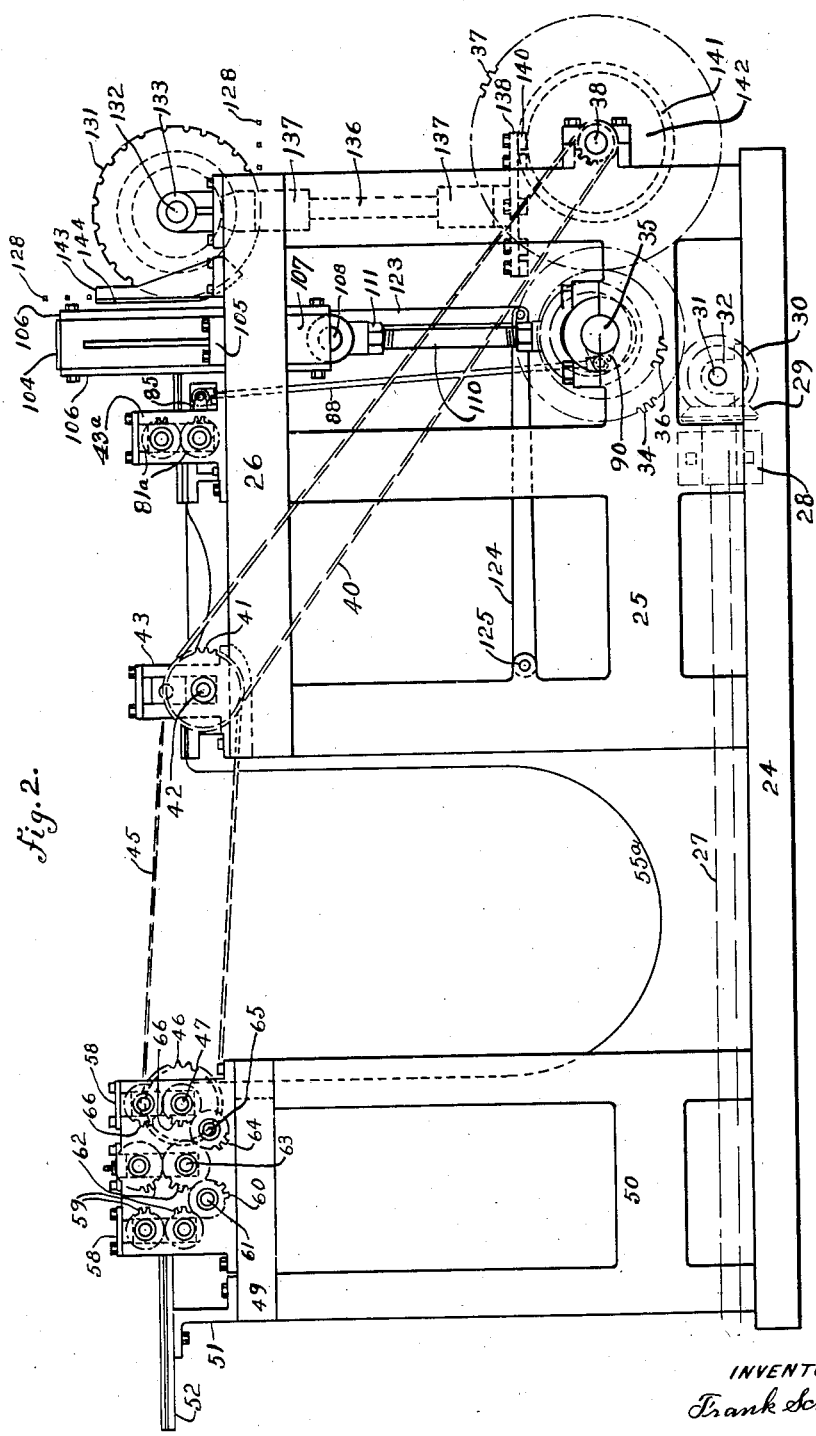
Fig. 2 is a side elevation thereof.

The rolls 56—67—78 are rotated constantly and the rolls 80 intermittently, when the rolls 80 are stationary, the constantly rotating rolls feed the paper forward which forms a sag or slack portion as shown in Fig. 2. This sag is taken up by the rolls 80 which are rotated by the crank 90 connecting rod 88 and bell-crank 85 through 90 degrees of revolution, intermittently, but which feeds the same amount of paper as the constantly rotating rollers. The cardboard 55 is slitted or cut into a suitable number of bands 55a, each of a width as is used to make a card of matches in a match book, usually ten matches. The bands 55a are fed by the feed rollers 80 through the recess 100b in stripper plate 99 and over the die above which is the punch composed of parts 100—101—102—103 and fastened to the cross-head 104 reciprocated in ways formed by bracket 105 and gibs 106, the reciprocation of said cross-head 104 taking place through shaft 108, bearing ends 109, rods 110, eccentric straps 112 and eccentrics 113 secured to shaft 35. (Figs. 1—2—3—9—11—12—13—14—15 and 17.) The die is composed of parts 115—116—117—118 and 119 and is fastened to the top of table 26.

The punch body has the steel punches 101 which are complementary to steel blades 118 in the die and which sever the cardboard into widths of a single match and depress every alternate match down into and between the blades 118 but does not completely sever the match.

As soon as the cardboard has stopped moving, the cut-off plate 120 is moved upwards by means of bars 123, arm 124, roller 126 and cam 127 until the top of plate 120 is flush with the top of the blades 118 in the die, the punch now descends, severs, and depresses the splint, the plate 120 moves downward and the cardboard is free to move forward, the match still attached to the main body of the cardboard. At the next forward feed the match cards are forced into the carrier and held by the clips. (Figs. 11—14 and right hand side of 15.)

The punch now again descends and the matches again severed and depressed but now the knife 103 on the punch comes down and meets the plate 120, severing the cards from the body of the cardboard. From this it is seen that the plate 120 moves upward to meet the punch, the rounded corner of the punch comes against the inner edge of the plate and kinks or marks the match where the line of severance ends and the outer edge of the plate forms a shear for the knife 103 to sever the cards from the body of the cardboard, and when the plate 120 has moved down leaves the matches free to move out of the slots in the die formed by the blades 118. (Figs. 12 and left hand side 13 and 15.) The contour of the periphery of the cam 127 is such that it effects this at the proper time. (See Figs. 11—12—14.)

Figure 3:
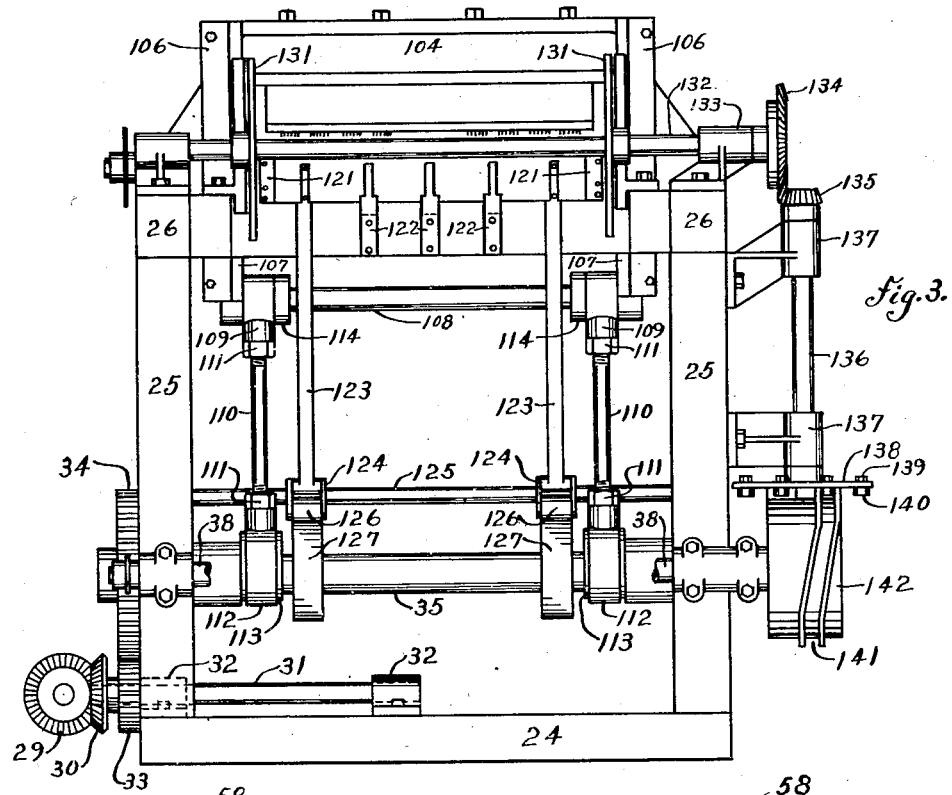
Fig. 3 is an end elevation looking towards the punch and die.
Figure 4:
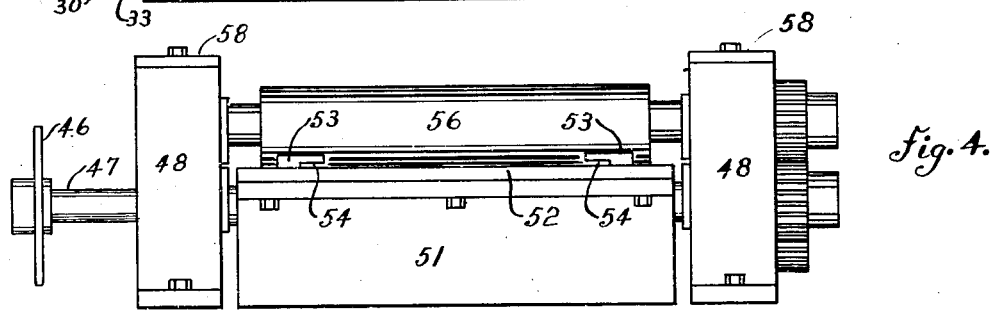
Fig. 4 is an enlarged view as on lines a—a of Fig. 1, showing the guides and feed rollers for the wide cardboard.
Figure 5:
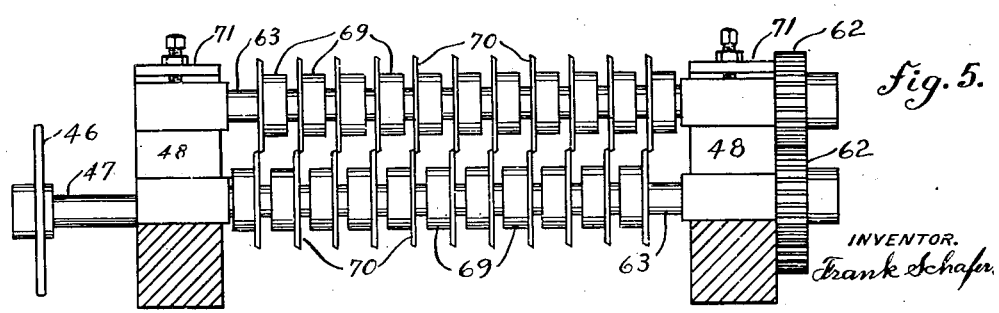
Fig. 5 is an enlarged sectional view, as on lines b—b of Fig. 1, showing the rotary knives for slitting the cardboard.
Figure 13:
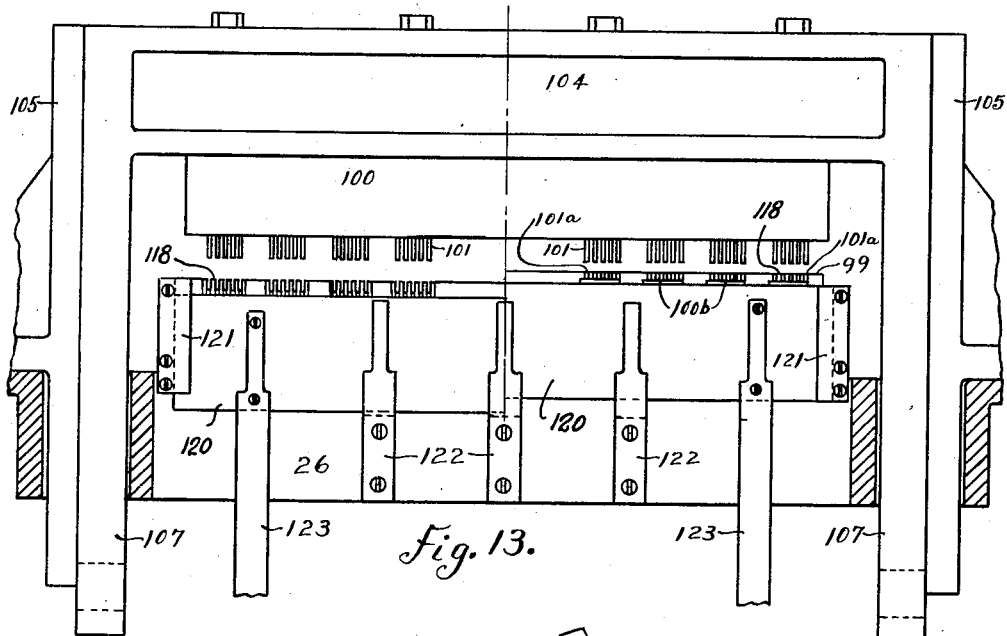
Fig. 13 is an enlarged view, partly sectional, of certain parts of the machine as shown in Fig. 3.

The steel punches 101 of the die pass through slots 101a in the stripper plate 99 and the cardboard 55a in the recesses 100b. (See Fig. 14 and right hand side of Figs. 13—15.) The varying intermittent movement of the carrier chain is effected by the cam 142 on shaft 38 through cam groove 141, rollers 140, disk 138, shaft 136, bevel pinion 135, bevel gear 134, shaft 132. (Figs. 1—2—3.)

Referring to Fig. 18, it will be seen that the distance between adjacent rows of cards varies. It is much less from B to C than D to E. The short distance is that between the cards clamped to the carrier bar 128 and the long distance where the joint of the link comes. The match cards are inserted during the dwell of the cam which occurs from E to B and C to D.

In Fig. 19 can be seen that this construction permits the use of much smaller sprockets for the time it takes to dry the heads of the matches after dipping.

In Fig. 16 is shown a view of the carrier in which each match card is held by an individual clamp spring. It is the practice in certain match plants to make the match cards in one piece, of ten books wide; it can be seen that this can easily be done, (Figs. 1—3—8—13—15) simply by inserting two more bands in the center, in which case it can be used in combination with any booking machine making ten books at a time. In the illustration, I have shown it as making eight match cards in two series of four each, and the reason therefor is that this application is to be followed by one in which a booking machine will be disclosed making four books at one time and two booking machines to each match machine. Hence, I do not wish to be limited to the number of card matches, as illustrated.

It is to be understood that my invention is not limited to the specific mechanisms or to the details of construction thereof herein illustrated, as the same may be variously modified without departing from the principle of the invention as defined in the appended claims.

I claim:

1. In a match making machine, means for continuously unwinding a roll of match stock, means for continuously severing the match stock longitudinally in bands the width of a match card, means for guiding and continuously feeding the bands to intermittently rotating feed rolls which feed the bands to a punch and die which sever the bands into match cards and inserting same into a carrier.

2. In a match making machine, means for feeding match stock to a punch and die in which the punch severs and depresses every alternate splint, a plate slidably mounted in guideways on the front face of said die, a cam to move said plate level with the top face of said die supporting the match stock during the formation of the splint and severance of the match card.

3. In a match making machine, means for feeding match stock to a punch and die in which the punch severs and depresses every alternate splint, a knife secured to said punch and co-acting with a plate slidably mounted in guideways on the front face of said die to sever the match cards, a cam to move said plate level with the top face of said die supporting the match stock during the formation of the splint and severance of the match card; and a carrier into which said cards are inserted by said feeding means.

4. In a match making machine, means for feeding match stock to a punch and die in which the punch severs and depresses every alternate splint, a plate slidably mounted in guideways on the front face of said die, a cam to move said plate level with the top face of said die supporting the match stock during the formation of the splint and severance of the match card, said cam moving said plate downwards to permit the feeding means to insert the match card without the depending splints coming in contact with said plates; and a carrier into which said cards are inserted by said feeding means.

5. In a match making machine, a match carrier comprising bars and links each bar having clamping elements thereon for holding a match card, each bar being less in width than the length of a link, a link at each end of each bar to engage a link at the adjacent end of another bar, and a cam moving the carrier intermittently different distances to bring the carrier in line to permit the insertion of the match card.

6. In a match making machine, a match carrier comprising bars and links each bar having clamping elements thereon for holding a match card, each bar being less in width than the length of a link, a link at each end of each bar to engage a link at the adjacent end of another bar, and a cam moving the carrier intermittently different distances to bring the carrier in line to permit the insertion of the match card and locking said bars during the insertion thereof.

7. In a match making machine, two pairs of feed rolls and severing means therebetween for continuously feeding and severing match stock into bands of the width of a single match card, a pair of continuously rotating feed rolls situated a distance from the aforesaid pairs of feed rolls, individual guideways for the bands, means for feeding the bands to a punch and die, forming a plurality of individual match cards, a cut-off knife secured to said punch, a movable plate coacting with the cut-off knife secured to the punch body for severance of the match card and a carrier into which said cards are inserted having a plurality of clamping elements thereon to clamp each individual card.

8. In a match making machine, two pairs of spaced continuously rotating feed rolls having rotating knives therebetween for severing match stock into bands of predetermined widths, a pair of continuously rotating feed rolls for feeding the severed bands, situated a distance from the aforesaid pairs of feed rolls so that a loop or sag in the severed bands may be formed in the space between the said spaced sets of feed rolls, a pair of intermittently rotating feed rolls, situated a distance from the second pair of feed rolls so that a loop or sag occurs between the continuously and intermittently rotating rolls, the latter feeding the bands to a punch and die for the formation of match splints and severance of the match card.

9. In a match making machine, two pairs of spaced continuously rotating feed rolls having rotating knives therebetween for severing match stock into bands of predetermined widths, a pair of continuously rotating feed rolls for feeding the severed bands, situated a distance from the aforesaid pairs of feed rolls so that a loop or sag in the severed bands may be formed in the space between the said spaced sets of feed rolls, guideways for each band to the latter rollers, a pair of intermittently rotating feed rolls situated a distance from the second pair of feed rolls so that a loop or sag occurs between the continuously and intermittently rotating rolls, guideways for the bands leading to and from the intermittently rotating rolls, the latter feeding the bands to a punch and die for the formation of match splints and severance of the match card.

10. In a match making machine, two pairs of spaced continuously rotating feed rolls having rotating knives therebetween for severing match stock into bands of predetermined widths, a pair of continuously rotating feed rolls for feeding the severed bands, situated a distance from the aforesaid pair of feed rolls so that a loop or sag in the severed bands may be formed in the space between the said spaced sets of feed rolls, guideways for each band to the latter rollers, a pair of intermittently rotating feed rolls situated a distance from the second pair of feed rolls so that a loop or sag occurs between the continuously and intermittently rotating rolls, guideways for the bands leading to and from the intermittently rotating rolls, the latter feeding the bands to a punch and die for the formation of match splints and severance of the match card, and a carrier into which said cards are inserted by said feeding means.

11. In a match making machine, a match carrier comprising spaced parallel bars, each bar having clamping elements thereon for holding two sets of match cards, said cards spaced by the width of the bar, each of said bars having a link at each end and each link engaging a link at the adjacent end of another bar, the combined length of the two links being greater than the width of the bar whereby the space between adjacent cards due to the bars is smaller than that due to the links.

FRANK SCHAFER.